United States Patent
Toftner

(10) Patent No.: US 7,234,558 B2
(45) Date of Patent: Jun. 26, 2007

(54) MOTORCYCLE FOR ADJUSTABLE RIDING POSTURES

(75) Inventor: Peer Toftner, Sarpsborg (NO)

(73) Assignee: Ostfold Innovasjon AS, Sarpsborg (NO)

( * ) Notice: Subject to any disclaimer, the term of this patent is extended or adjusted under 35 U.S.C. 154(b) by 272 days.

(21) Appl. No.: 10/830,056

(22) Filed: Apr. 23, 2004

(65) Prior Publication Data

US 2005/0236203 A1 Oct. 27, 2005

(30) Foreign Application Priority Data

Apr. 19, 2004 (NO) ................................. 20041578

(51) Int. Cl.
*B62K 11/14* (2006.01)
*B62M 7/00* (2006.01)

(52) U.S. Cl. .................. 180/219; 74/551.3; 280/279; 280/291

(58) Field of Classification Search ................ 180/219; 280/291, 270, 278, 287; 74/551.3, 551.4, 74/551.1, 564, 551.6
See application file for complete search history.

(56) References Cited

U.S. PATENT DOCUMENTS

| | | | |
|---|---|---|---|
| 4,462,634 A | 7/1984 | Hanagan | |
| 4,506,754 A | 3/1985 | Hirano et al. | |
| 4,546,993 A * | 10/1985 | Walker | 280/291 |
| 5,458,213 A | 10/1995 | Nakaya et al. | |
| 5,661,999 A * | 9/1997 | Carone | 74/473.16 |
| 6,332,625 B1 * | 12/2001 | Fukunaga et al. | 280/280 |
| 6,578,652 B1 * | 6/2003 | Kobacker et al. | 180/219 |
| 6,758,484 B1 * | 7/2004 | Rice | 280/304.4 |
| 6,846,018 B2 * | 1/2005 | Dennert et al. | 280/785 |

* cited by examiner

*Primary Examiner*—Anne Marie Boehler
(74) *Attorney, Agent, or Firm*—Young & Thompson

(57) ABSTRACT

A motorcycle construction permits a rider to assume either a first, elevated crouched racing position, or a second lowered, reclined, feet-forward "custom chopper" position. The motorcycle includes a main frame assembly having a front wheel suspension assembly and a set of handlebars, and a rear wheel suspension assembly with a rear wheel, and a combined engine/transmission assembly. The main frame has a seat for a driver, and a driver footpeg assembly. The footpegs provide a fore position for use with the reclined "custom chopper" position, allowing the driver's legs to be extended in a forward direction for using the fore footpeg position. The footpegs provide an aft position for use with the elevated crouched racing position. A seat moving assembly moves the driver seat between the first elevated position, used with the aft footpeg position, and the second, lowered seat position is used with the fore footpegs position.

23 Claims, 15 Drawing Sheets

MOTORCYCLE FOR ADJUSTABLE RIDING POSTURES

INTRODUCTION, BACKGROUND OF THE INVENTION

This invention relates to a motorcycle being adjustable with respect to seat elevation and footpeg positions with the purpose to accommodate for at least two widely different riding positions and body postures. The motorcycle of the invention may thus be adapted to widely different requirements on the combined "man and machine" when a change in driving environments changes from e.g. a sharply curved road under high speed racing-like driving conditions, to less demanding driving conditions, e.g. slow driving along a straight avenue. The purpose of driving a motorcycle may vary according to the user in question, but many drivers would like to be able to vary between driving fast in a more or less crouched position, and driving with style and doing so in a relaxed manner. Almost all drivers would give priority to driving safely. The motorcycle of the invention provides it all, a racing-like motorcycle including mechanical features allowing the machine to be altered into a laid-back custom cruiser motorcycle for comfortable riding, or vice versa, while rendering particularly foot braking and foot gear shifting control to the rider without interruption.

KNOWN ART IN THE FIELD

U.S. Pat. No. 4,462,634 to Hanagan describes an adjustable motorcycle seat arranged in a two-part seat assembly for adjusting the inclination of the driver's seat and thereby to enable alteration of the operator's body attitude.

U.S. Pat. No. 4,506,754 to Hirano provides a motorcycle with a footrest and a seat so the feet of the rider are axially forward of the rider's knees, and either the footrest or seat or both is adjustably movable so the axial distance between them can be adjustably varied. However, the range of variation for the driver's body attitude is rather narrow, the adjustment of the rider's back support being adjustable between a completely laid-down position not for use as a back rest, and an upright position for use as a back rest. The motorcycle of Hirano seems to define a halfway reclined-posture touring-only motorcycle, providing no means for racing-like driving, which would be prevented completely by the reclined body posture for the driver.

Nakaya describes in his U.S. Pat. No. 5,458,213 a "fully adjustable" motorcycle so as to permit the use of a single motorcycle as either a touring or racing machine. The handlebar assembly is adjustable along an arc as are the footpegs with the center of movement of the arc being midway disposed between the handlebar and the footpegs. The solution of Nakaya provides not really a fully adjustable motorcycle but a machine that may be used for racing and a rather awkward and crouched-leg upright touring.

None of the mentioned motorcycles of the known art render any solution to the usual desire of the driver of well extending the legs midway during a demanding racing-like long drive without stopping and without assuming potentially dangerous driving postures, like moving back to the passenger's seat for a while, or stretching the legs forward past the engine without proper foot support, or moving the feet backward onto the passenger's footpegs, both of the latter postures abandoning foot control over both the foot brake and gear pedal levers for most motorcycles, and all postures disturbing the riding balance.

SUMMARY OF THE INVENTION

The above problems are solved by means of a motorcycle according to the invention, being a motorcycle construction for permitting a rider to assume either a first elevated crouched racing position, or a second lowered, reclined, feet-forward "custom chopper" position, said motorcycle including a main frame assembly provided with a front wheel suspension assembly holding a front wheel as well as a handlebar assembly, and a rear wheel suspension assembly holding a rear wheel, and a combined engine/transmission assembly arranged for driving said rear wheel (or said front wheel or both wheels), said main frame further provided with a seat for a driver, and a set of handlebars provided with handgrips for enabling the driver to steer and control said motorcycle, and a driver footpeg assembly arranged on said main frame, including one or more sets of driver footpegs, said footpegs having a fore position for use with said reclined "custom chopper" position, allowing for said driver's legs to be extended in a forward direction for resting said driver's feet on said fore footpeg position, and said footpegs having an aft position for use with said elevated crouched racing position, allowing for said driver's feet to be supported on said aft footpeg position generally below said seat, said main frame further provided with a seat moving assembly for moving said driver seat between said first elevated position, for use with said aft position of said footpegs, and said second lowered seat position for use with said fore position of said footpegs.

Two preferred embodiments of this general invention are presented. A first general embodiment has two pairs of footpegs for the driver, a first fore pair of footpegs with a complete set of braking and gearshift lever pedals, and a second aft pair of footpegs also provided with a second complete set of braking and gear shifting lever pedals. A second general embodiment has one single fore-and-aft movable pair of footpegs for the driver, provided with a complete set of co-located braking and gear shifting lever pedals. Both general embodiments of the motorcycle may be equipped with an angularly adjustable steering handlebar for adapting the positions of the handgrips for the two or more widely different riding postures provided by the cooperatively and widely fore-and-aft changed positions of the footpegs and the widely changed elevation of the seat.

BRIEF DESCRIPTION OF THE DRAWINGS

The invention is illustrated in the accompanying drawing figures. The drawings shall not be construed to limit the invention, which shall be limited by the set of claims only.

SPECIFICATION OF THE PREFERRED
EMBODIMENTS OF THE INVENTION

Figure 1:
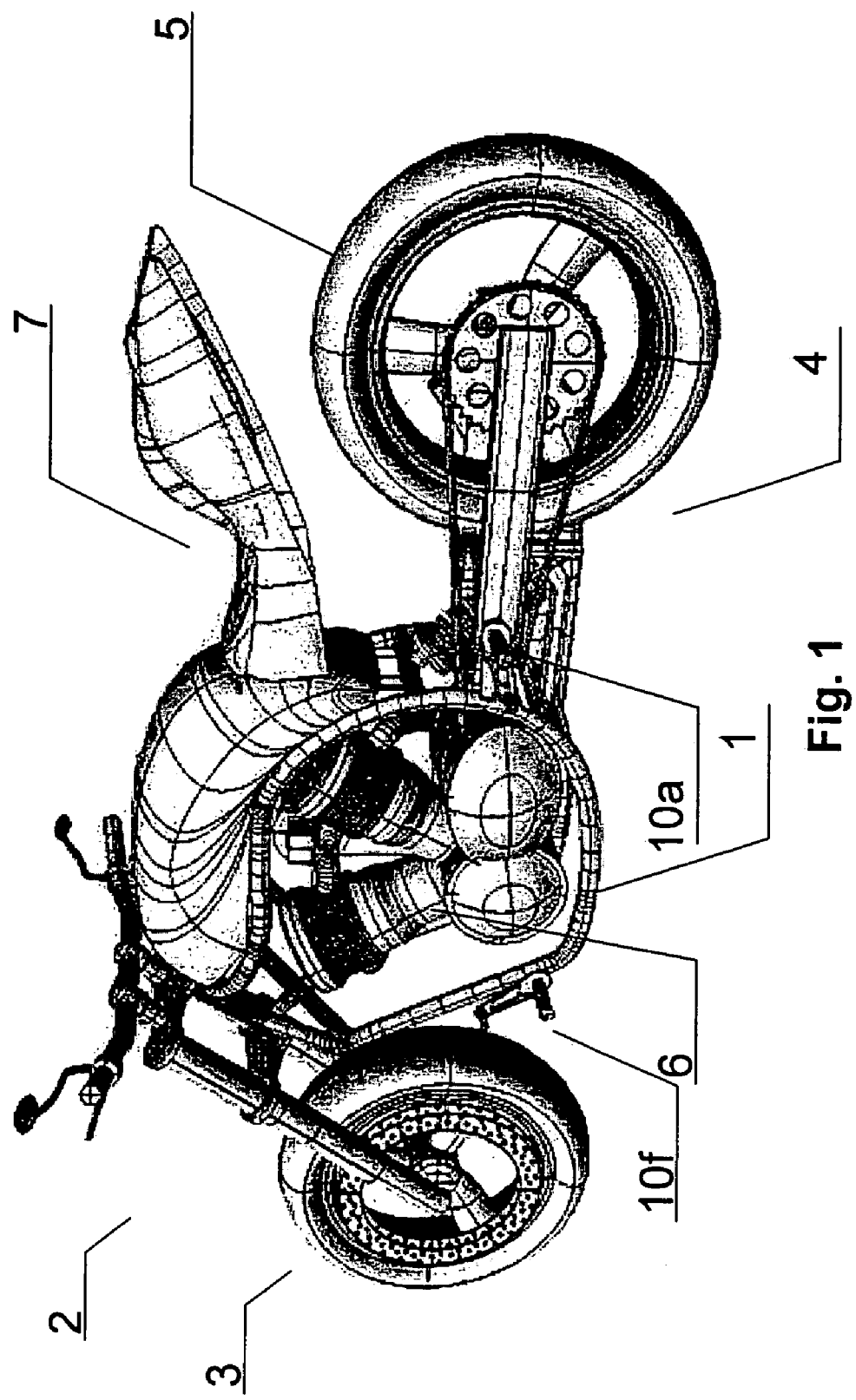
FIG. 1 is a left side view perspective illustration of a motorcycle according to a first, preferred embodiment of the invention. The first alternative embodiment shown is complete with a main frame with an engine and transmission assembly, a fuel tank, a driver (and passenger) seat and rear wheel mudguard assembly, and fore and aft pairs footpeg assemblies, a front wheel assembly with handlebars, and a rear wheel assembly with a drive chain.
Figure 2:
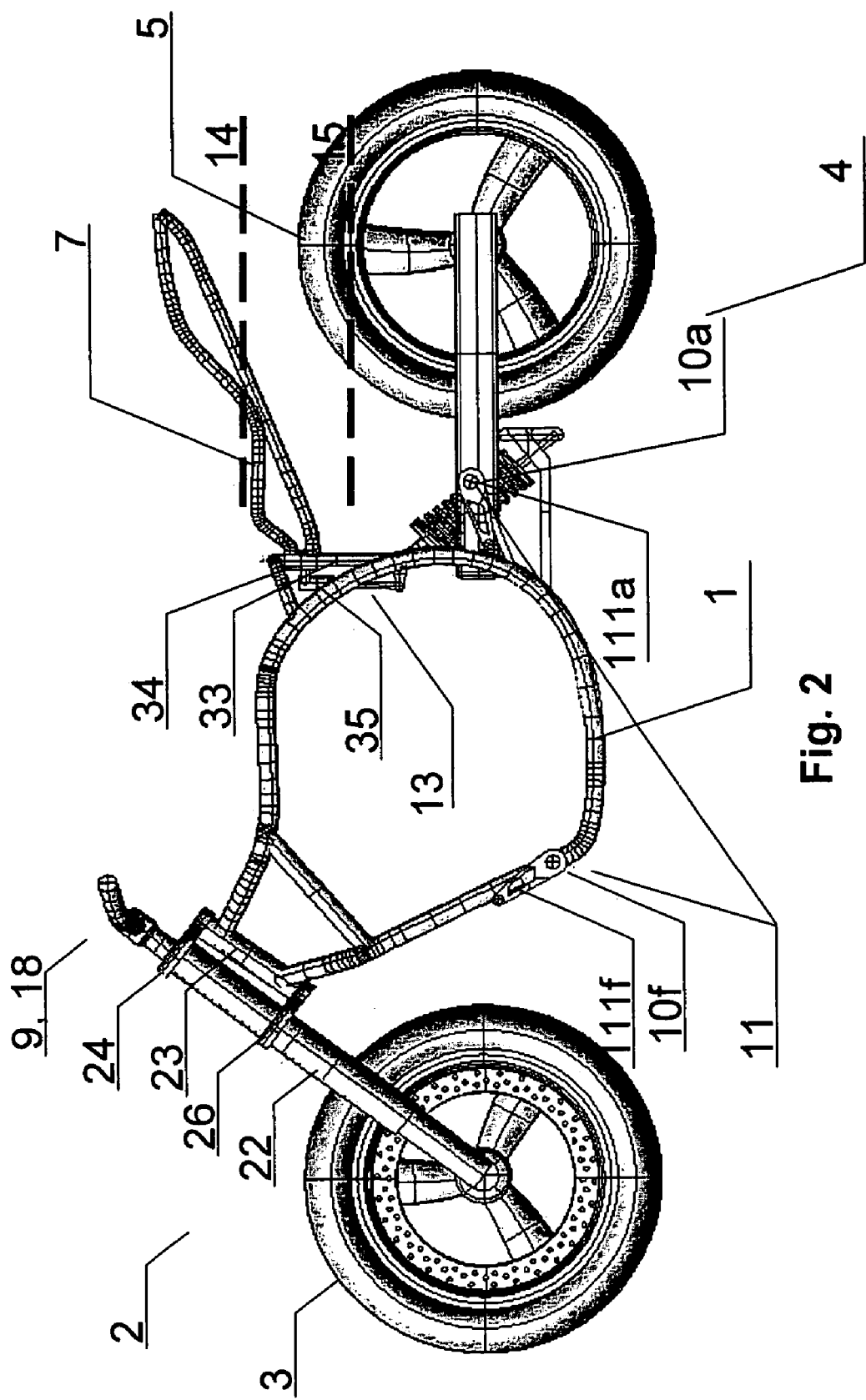
FIG. 2 is a left side elevation view of a stripped-down version of the first alternative embodiment shown in FIG. 1, showing the motorcycle frame with front and rear wheel assemblies, an elevation adjustable driver seat assembly for being moved along a generally vertical rail, and the fore and aft footpeg assemblies, the left side footpegs visible only.

The invention relates to a motorcycle construction for permitting a rider to assume either a first, elevated crouched racing position, or a second lowered, reclined "custom chopper" position. One embodiment of such motorcycle is illustrated in FIG. 1. The motorcycle includes a main frame assembly (1) provided with a front wheel suspension assembly (2), holding a front wheel (3) as well as a handlebar assembly (9), and a rear wheel suspension assembly (4) holding a rear wheel (5). The motorcycle may be provided with a combined engine/transmission assembly (6) in a usual manner, arranged for driving said rear wheel (5) or said front wheel (3) or even arranged for driving both wheels (5,3) if desirable.

A motorcycle construction according to the invention permits a rider to assume either a first elevated crouched racing position, or a second lowered, reclined, feet-forward "custom chopper" position. The motorcycle illustrated in FIGS. 1 to 8 comprises a main frame assembly (1) provided with a front wheel suspension assembly (2), holding a front wheel (3) as well as a handlebar assembly (9, see FIGS. 11 and 12), and a rear wheel suspension assembly (4) holding a rear wheel (5), and a drivetrain here shown as a combined engine/transmission assembly (6) arranged for driving said rear wheel (5) or said front wheel (3) or both wheels (5,3).

Figure 7:
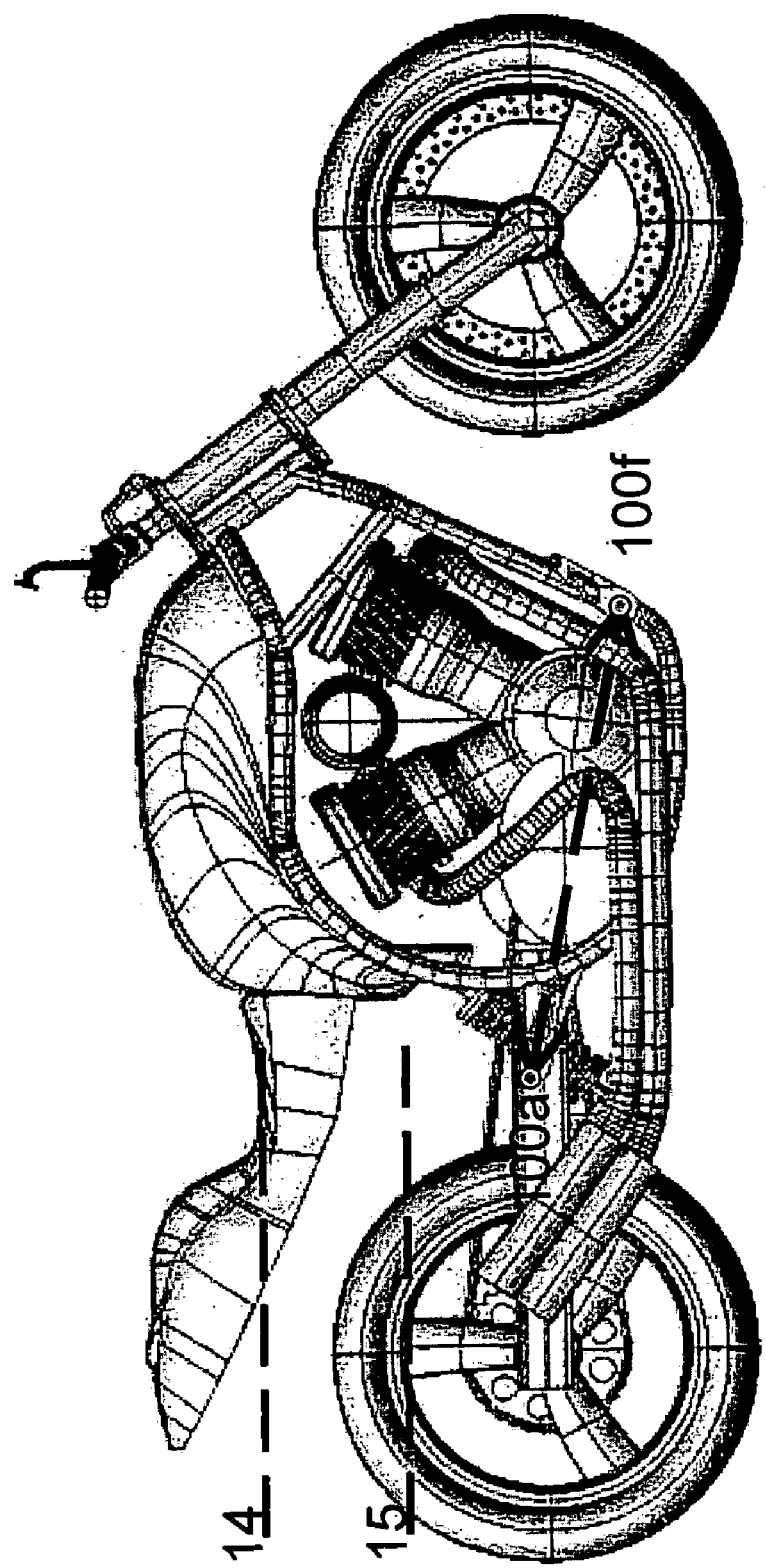
FIG. 7 is similar to FIG. 5, but showing the motorcycle provided with a tank cover on top of the frame, and one or more upholstered seat cushions on the seat frame and also provided with a rear wheel mudguard arranged integrated in connection with the seat and the seat frame, shown together in an elevated position. A line is drawn between a fore footpeg position and an aft footpeg position for the driver, said fore and aft positions in one embodiment being occupied by separate pairs of footpegs. Between said fore footpeg position and said aft footpeg position is indicated a position for an alternative fore-and-aft moveable single pair of footpegs for the driver.
Figure 8:
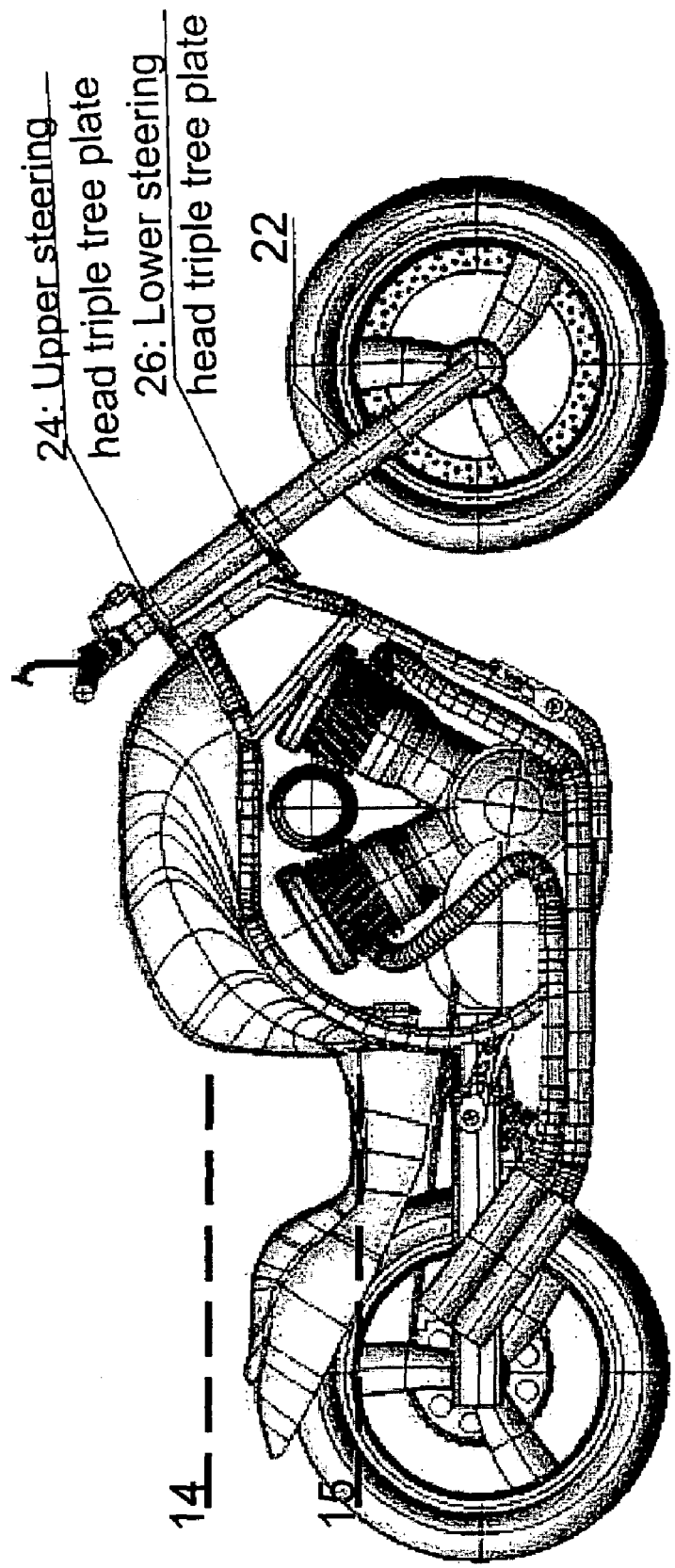
FIG. 8 s similar to FIG. 6 but showing the motorcycle provided with said tank or tank cover on top of the frame, and one or more upholstered cushions on the seat frame and showing the combined seat and rear wheel mudguard in a lowered position. Notice that the seat frame with the mudguard assembly now partly envelopes or covers an upper and fore upper part of the rear wheel.
Figure 9:
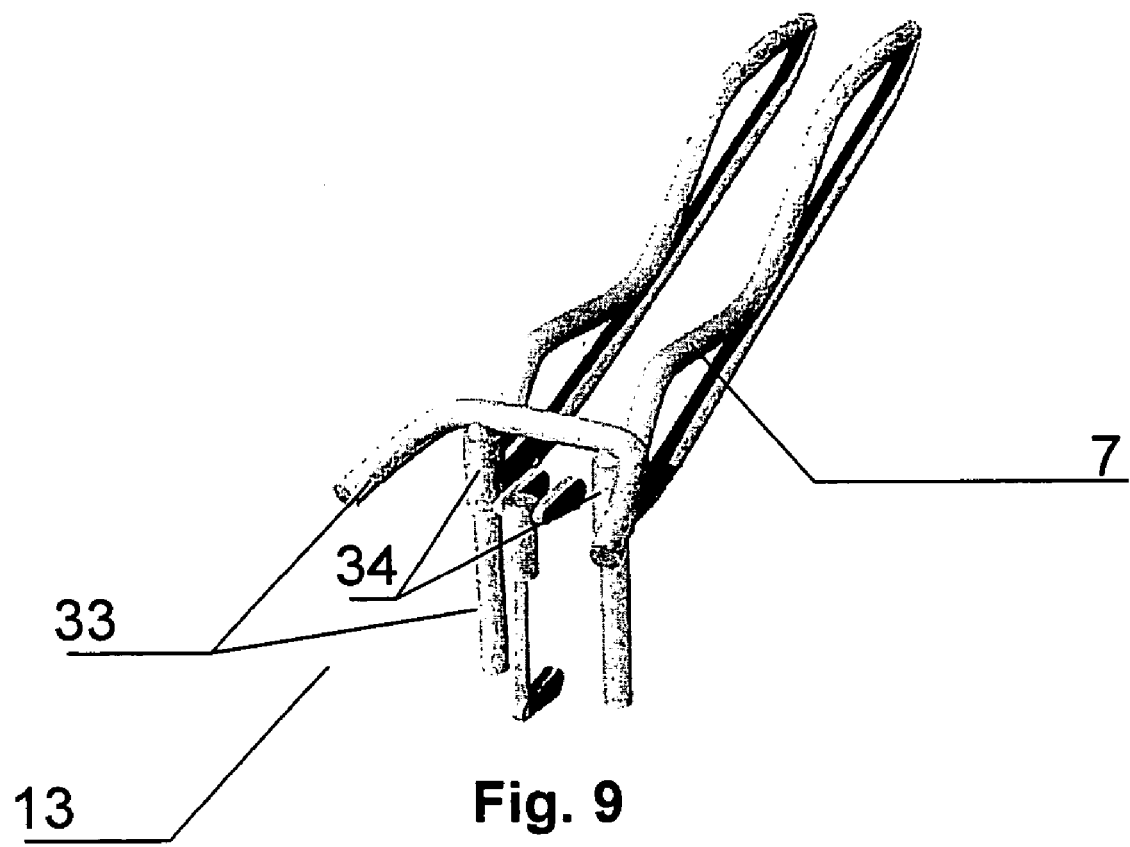
FIG. 9 is an illustration of the seat frame and elevator assembly first shown in FIG. 2, showing a vertically moveable seat frame fixed to a pair of bushings arranged for running on a pair of vertical slide rails, and also showing an actuator for moving said seat frame along said generally vertical slide rails.
Figure 10:
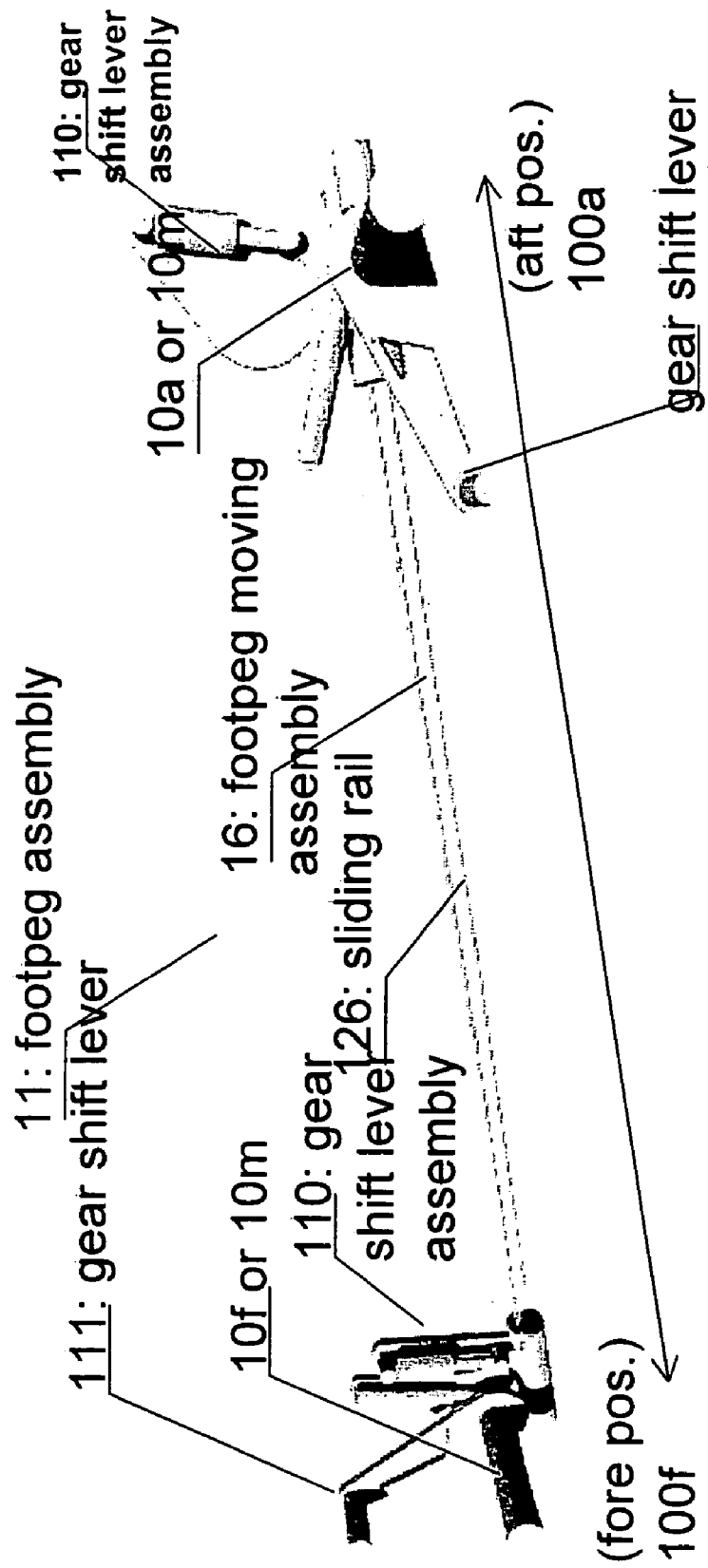
FIG. 10 is a perspective view from the left side of the motorcycle according to the invention, of a footpeg assembly of which a footpeg is moveable between an aft and slightly elevated foot position for a rather crouched driving posture of the driver, and a fore, relatively slightly lower position for a forward extended posture for the driver's leg. The aft position is for a crouched, agile or "racing-like" driving position to be combined with an elevated seat position to provide a good bodily posture to command the motorcycle during acceleration, high speed driving on straight roads and attacking sharp road curves, and during hard braking. The fore position is to be combined with a lowered seat position, for a more reclined, relaxed driving posture, either for the mere joy of slow riding per se, or for recovering from hard riding, or both. Moreover, a gear shift lever having a quite steeply upward pointing neutral position is shown with the fore footpeg position, and a second gear shift lever position (in which the gearshift lever assembly may be moveable with the footpeg and thus being the same as the fore position shown gear shift lever assembly in a preferred embodiment of the invention) having a rather level or slightly downward pointing attitude with the footpeg, the fore position adapted for a more or less extended leg and the rear position adapted for a crouched leg posture. The gearshift lever assembly may be arranged on the right side of the motorcycle. A similar fore and aft brake pedal position (not illustrated) coinciding with the footpeg positions ($100f$, $100a$), preferably moving with the moving set of footpegs ($10m$) may be designed similar to the gear shift lever assembly.
Figure 11:
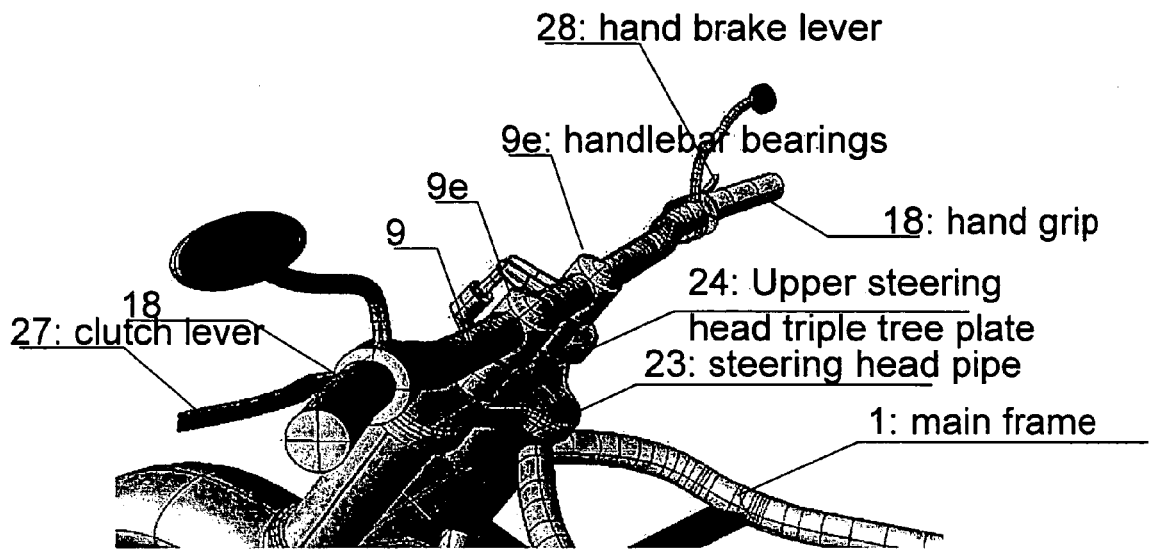
FIG. 11 is a perspective view seen from the left side of the fore part of the main frame with a steering head assembly including an inclined steering head pipe with bearings for steering-rotatable upper and lower steering head triple tree plates holding the upper portions of telescopic front wheel suspension fork arms. A handlebar is mounted rotatable about a horizontal axis in bearings on the upper steering head plate with handgrips with clutch lever, hand brake lever, and mirrors.
Figure 12:
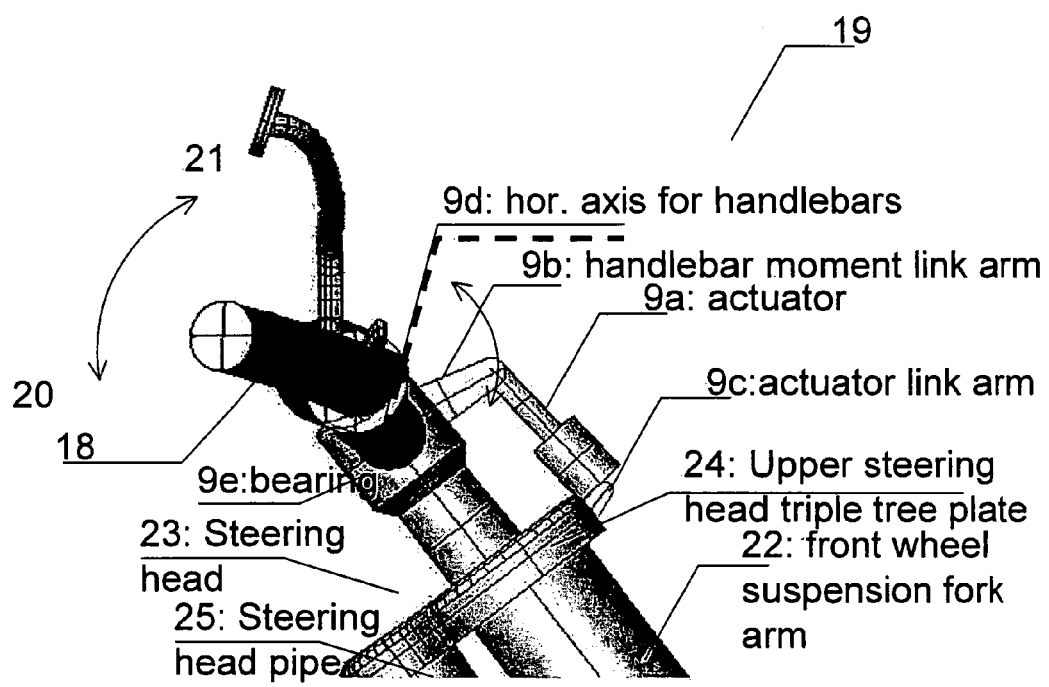
FIG. 12 is a side elevation view as seen from the right side of the handlebar and the steering head, showing the handlebar moment link arm and arm actuator in profile and illustrating the linkage from the, actuator to the upper steering head triple tree plate.
Figure 13:
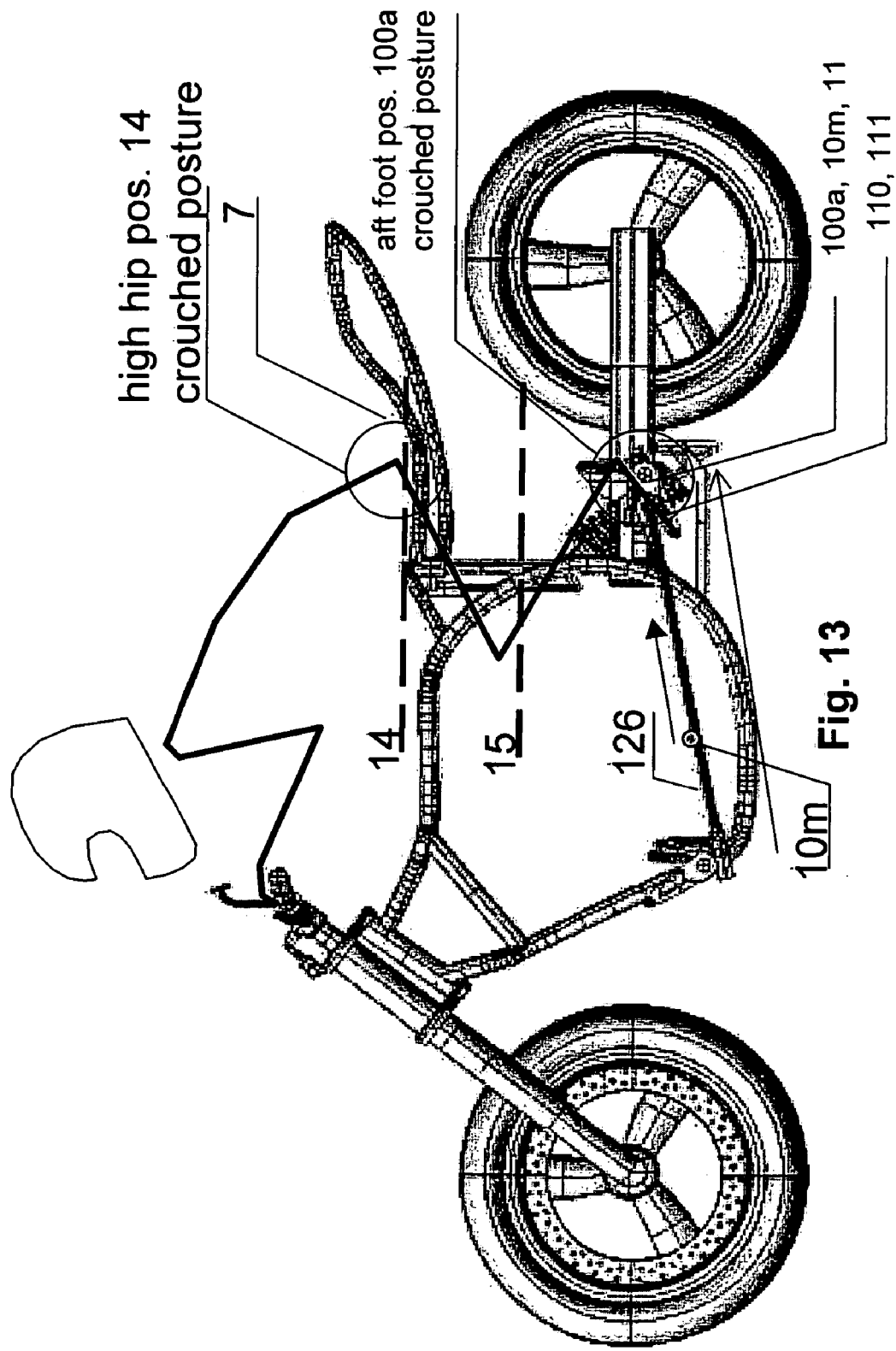
FIG. 13 is an illustration of an embodiment of the invention shown in a stripped version with a seat frame being vertically moveable, here shown in a high position and with a moveable pair of footpegs shown as being in or sled to an aft position for the combined use in a crouched posture for the rider. A pin-figure rider is illustrated in said crouched posture.
Figure 14:
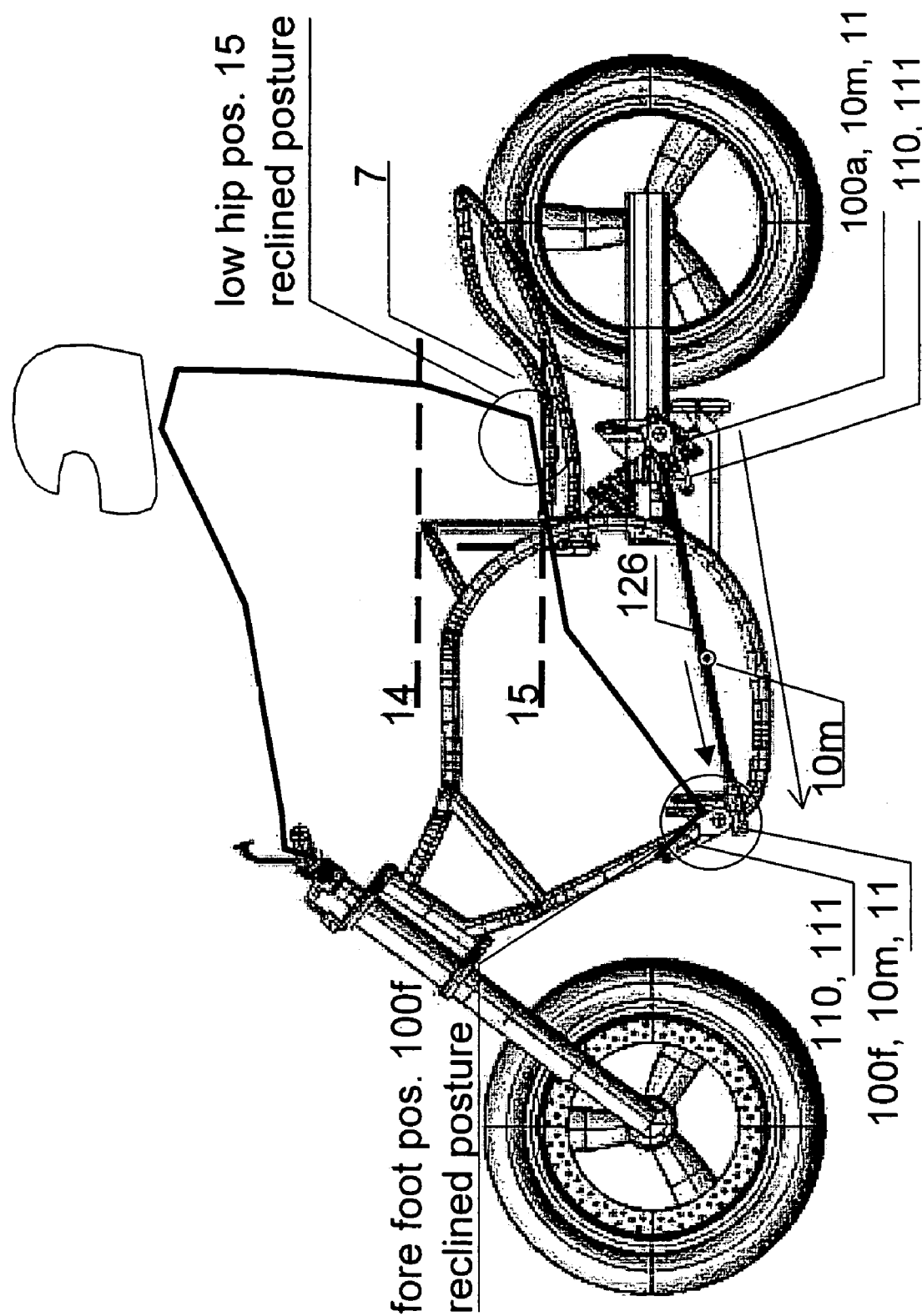
FIG. 14 is an illustration of an embodiment of the invention shown in a stripped version like FIG. 13, but with said seat frame shown in a low position and with said moveable pair of footpegs shown as being in or sled to a fore position for the combined use in a reclined posture for the rider. The pin rider is illustrated in this more or less reclined posture.
Figure 15:
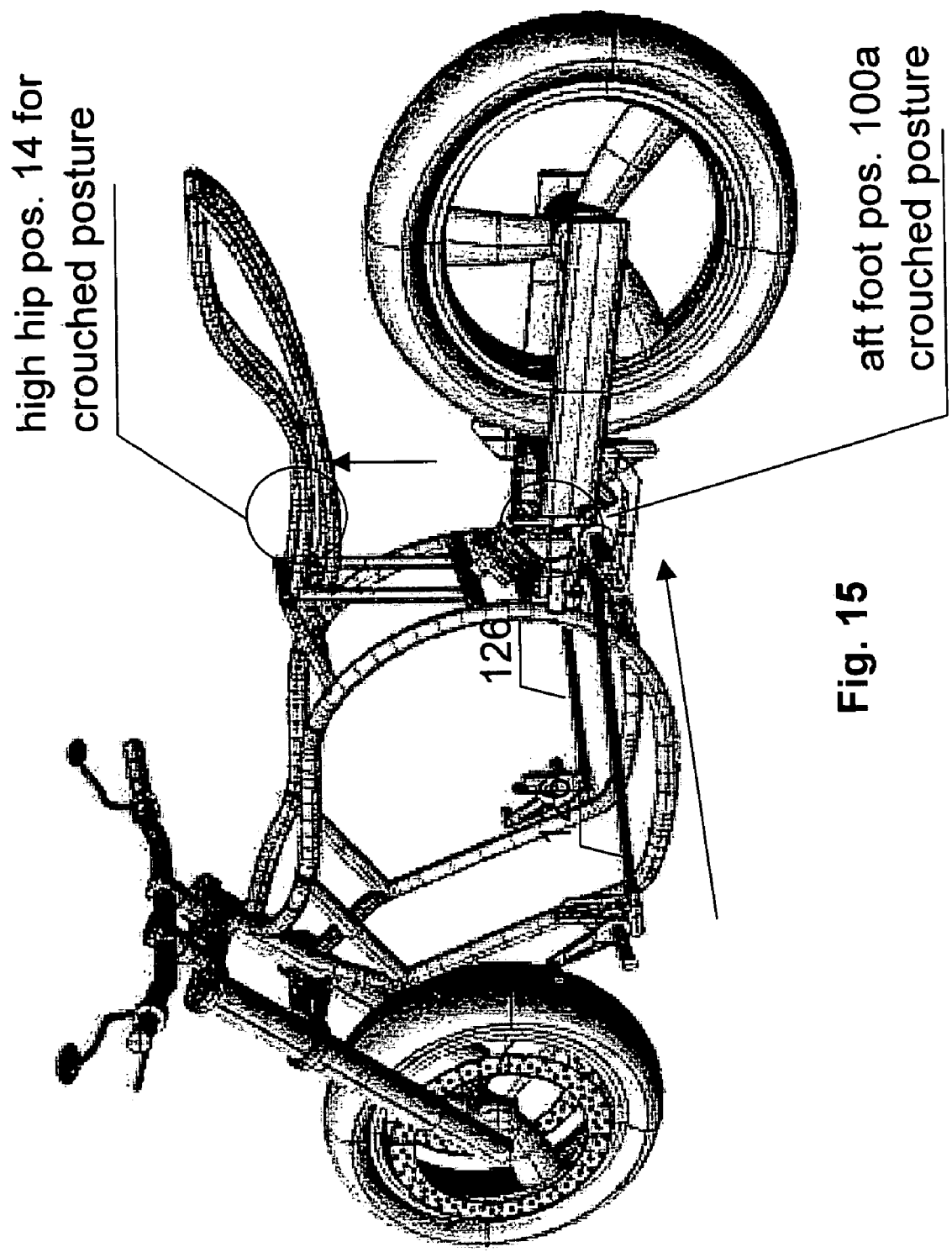
FIG. 15 is a left side perspective view slightly from aft, showing a motorcycle according to the invention in a stripped version without drivetrain, seat cushions, tank cover and mudguards, with the seat frame in the high hip position and the pair of foot pegs moved to the aft position, for use for the rider in a crouched posture, like illustrated in FIG. 13.
Figure 16:
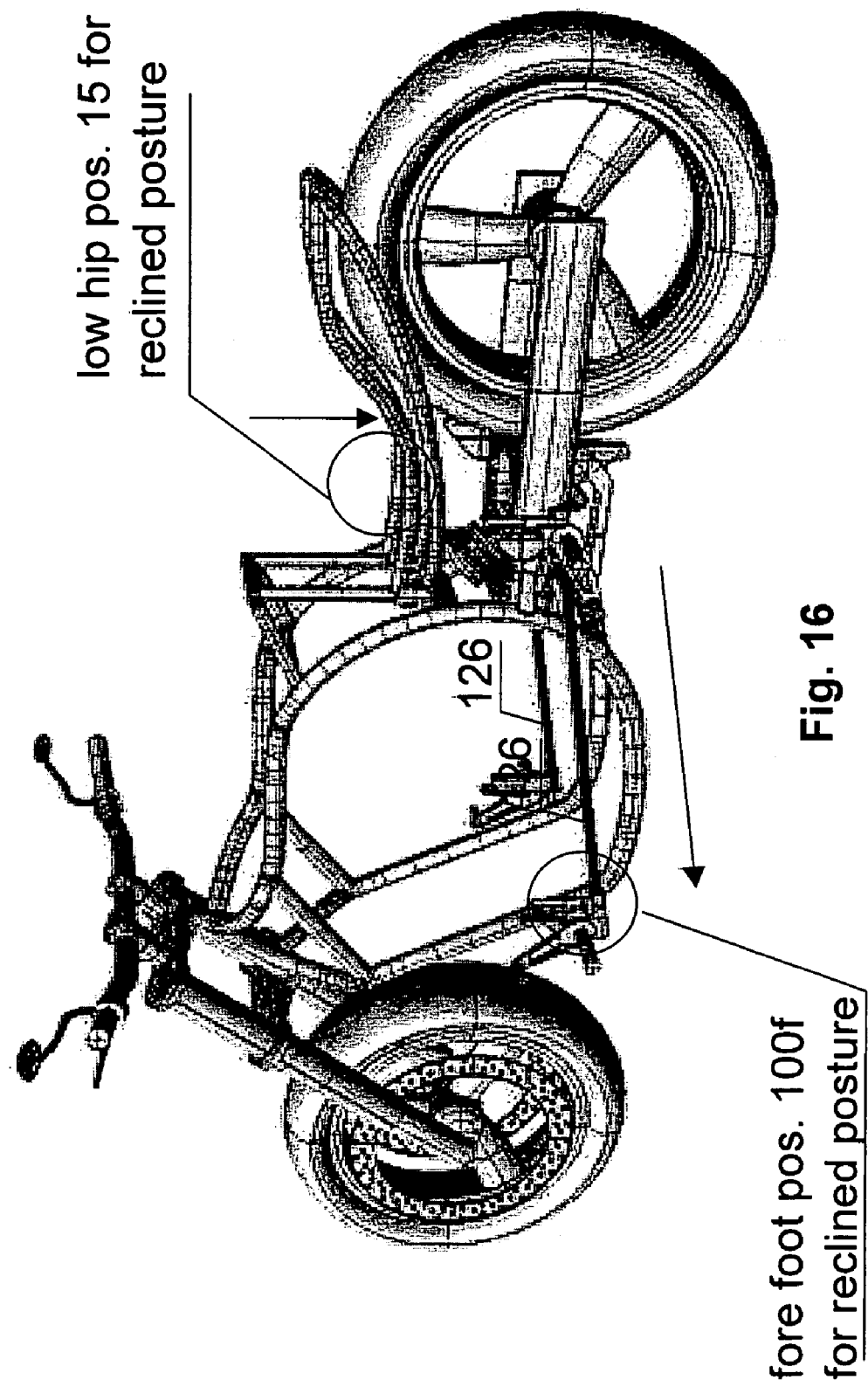
FIG. 16 is a left side perspective view slightly from aft, similar to FIG. 15, but with the seat frame in the low hip position and the pair of foot pegs moved to the fore position, for use for the rider in a reclined posture, like illustrated in FIG. 14.

The main frame is further provided with a driver saddle or seat (7) illustrated in FIG. 1 and FIG. 7, and also illustrated as only a seat frame in FIG. 9. The seat is for a driver, but may also include a passenger seat position behind the drivers seat position, usually in conjunction with or extension of the driver saddle or seat (7). The seat discussed in the context of this invention is the driver's seat. A handlebar assembly (9), also illustrated in FIGS. 11 and 12, is provided with handgrips (18) for enabling the driver to steer and control the motorcycle.

An Embodiment With Two Fixed Sets of Driver Footpegs.

In one general embodiment of the invention, the main frame is provided with two pairs of footpegs, one fore footpeg pair (10f) and an aft footpeg pair (10a) for the driver's feet. The fore positioned pair (10f) is intended for use with a reclined "custom chopper" position and is arranged on the main frame assembly (1) at a fore position, allowing for said driver's legs to be extended forward. The aft pair (10a) of footpegs is intended for use with an elevated and crouched racing position, allowing for the driver's feet to be positioned generally below the seat (7).

The main frame (1) of the above-mentioned general embodiment is further provided with a seat moving assembly (13) for moving the driver's seat (7) between a first elevated position (14), for use with the aft pair of footpegs (10a), providing a well-balanced crouched position for the driver. Important in this aspect is the elevated sitting position allowing the rider to quickly shift between a right side and an opposite left side riding position for better allowing to attack rapidly oncoming right and/or left turning road curves during fast, racing or racing-like driving conditions. The second, lowered seat position (15) is intended for use with the fore pair of footpegs (10f), for providing a comfortable low-riding reclined sitting posture for calm riding conditions during which there should be a reduced need for quickly shifting from one curve driving posture to an opposite side curve driving posture. The seat (7) may advantageously carry underneath a mudguard assembly for said rear wheel (5), both with the purpose of style, and for reducing the mass of the rear wheel assembly (4) in order to improve suspension characteristics.

The motorcycle structure according to the first general embodiment includes two fixed sets of foot operated gearshift lever assemblies (110a, 110f). A first gearshift lever assembly (110f) is arranged for use with the fore right and left footpegs (10f) and has a foot operated fore gearshift lever (111f), usually arranged on the left side of the motorcycle. A second gearshift lever assembly (110a) is arranged for use with the aft right and left pair of footpegs (10a) and has a foot operated aft gearshift lever (111a), also usually arranged on the left side of the motorcycle. The gearshift lever assemblies (110a, 110f) are connected to the gearbox part of the drivetrain (6).

The motorcycle construction according to said first general embodiment of the invention comprises two fixed sets of foot operated brake pedal lever assemblies (115a, 115f), one first brake pedal lever assembly (115f) arranged for use with said fore footpegs (10f) and having a foot operated fore brake pedal lever (116f), usually arranged on the right side of the motorcycle. A second brake pedal lever assembly (115a) is arranged for use with the aft footpegs (10a) and has a foot operated brake pedal lever (116a), also usually arranged on the right side of the motorcycle. The brake pedal lever assemblies (115a, 115f) are connected to a braking device for braking one of said fore or aft wheels (3, 5), or both.

The motorcycle construction of the invention may further be provided with a handlebar adjustment assembly (19) for adjusting the handlebar (9) with handgrips (18) between a rearward custom cruiser position (20), and a forward racing position (21). One important aspect of having a rotating adjustable handlebar is to provide handles in line with the lower arms of the driver depending on his posture, even when the handlebar is more or less "flat" as shown in FIGS. 11 and 12. Another aspect is to provide a corrected mirror view angle while the posture of the rider changes. See below about the arrangement of levers. Also, in case of a more bent handlebar in which the hand grips rotate with a radius about the handlebar's horizontal axis, the handgrips will move along larger circles and thus move both with respect to longitudinal and height positions. The handlebar adjustment assembly is shown in FIGS. 5, 6, 7, and 8, and in more detail in FIGS. 11 and 12. More specifically, the main frame (1) may include a steering head assembly (2) with an inclined steering head pipe (25) with bearings for rotating upper and lower steering head triple tree plates (24, 26) holding upper portions of preferably telescopic front wheel suspension fork arms (22) holding said front wheel assembly (2,3). The handlebar (9) may be mounted for being pivoting about the mentioned horizontal axis (9d) in bearings (9e), see FIGS. 11 and 12, arranged on said upper steering head triple tree plate (24), said upper steering head triple tree plate (24) being provided with a forward extending actuator link arm (9c) holding an actuator (9a) connected to a handlebar moment link arm (9b) for rotating said handlebar (9) in its bearings (9e) while said actuator (9a) is shortened or lengthened, so as to adapt said handlebar (9) and handgrips (18) for a rearward reclined position (20) or for a forward high position (21). Said actuator may be electrically, hydraulically or pneumatically driven of a kind selected by the mechanical designer of the motorcycle.

The handlebar assembly may be provided with a clutch lever (27) corresponding with a first of said handgrips (18), and a hand brake lever (28) corresponding with a second of said handgrips (18), and rear view mirrors (29) in the usual manner. The clutch lever (27) and the hand brake lever (28) are in a further preferred embodiment of the invention be directly linked to said handlebar rotating actuator (9a) through said handlebar (9) in order to adjust their angular position when said handlebar (9) is rotated, so as for said hand brake lever (28) and clutch lever (27) to adapt to be in line with the driver's forearm when the handlebar (9) is rotated while changing the driver's posture, in order to maintain the driver's control on the brake and clutch levers (27, 28).

In a preferred embodiment of the motorcycle construction according to the invention, the seat moving assembly (13) is arranged for halting said seat (7) in any desired intermediate position between said upper position (14) and said lower position (15).

Elevator Seat Frame Assembly.

The seat moving assembly (13) according to a first alternative may include a more or less vertically inclined rail or rails (33) fixed to the main frame (1) and generally arranged immediately in front of said driver's seat (7), like illustrated in FIGS. 2, 5–8, and 9. The profile of the rail may be more or less an "H"-profile, or the rail may be tube-shaped. The rail or rails includes one or more vertically running short, elongate sleeves (34) with bushings of nylon, teflon, ball bearings, brass or steel, arranged for sliding on said rails, with said seat (7) welded or otherwise fixedly attached to said sleeves (34). Alternatively, the seat frame (7) rail sleeves (34) may be provided with small rollers (not illustrated) for rolling up and down on said rails (33). A seat elevation actuator (35) may be fixed with one junction to said main frame (1), and a second junction fixed to said seat (7) or fixed to said vertically running sleeves (34) to provide elevation force. The actuator (35) may be remote controlled from the handlebar assembly by an electrical switch device connected to said elevation actuator (35) by means of electrical cables and provided with energy from an accumulator battery being a normally provided device for most motorcycles, the battery usually giving power for an electrical starter engine, headlamps, direction indicator lights, and an onboard computer, all not shown in the drawings. The accumulator battery may be charged in the usual manner using an ordinary on-board electrical dynamo integrated in the engine assembly (6). As an alternative to an electrically driven seat actuator (35) the seat actuator (35) may be hydraulically or pneumatically driven and controlled using fluid pumps, valves and fluid lines.

Pivoting Seat Frame Assembly.

Figure 3:
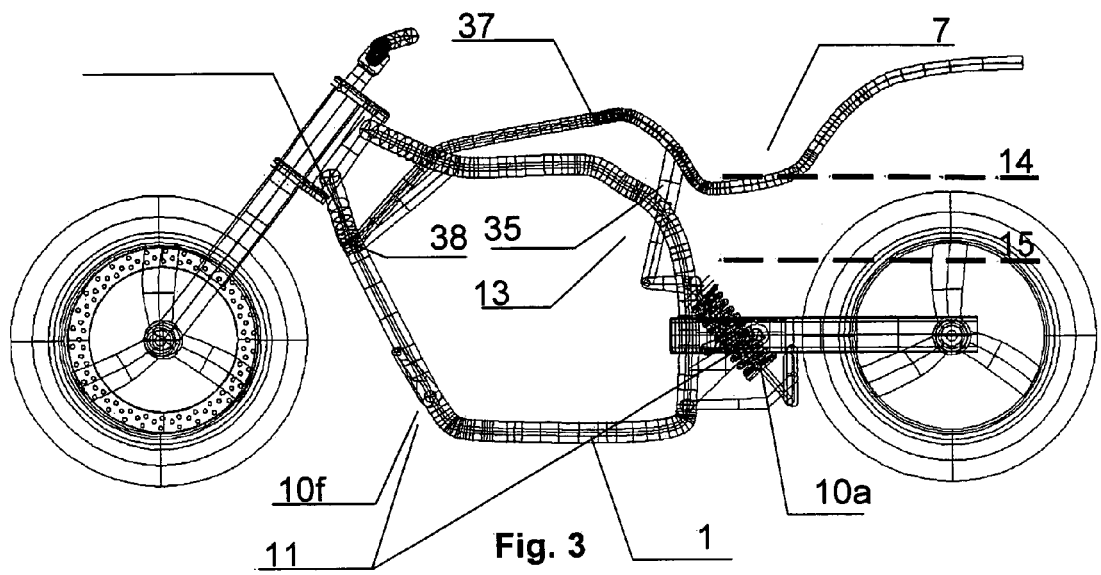
FIG. 3 shows a left side elevation view stripped-down version of an second, alternative embodiment of the invention, with a seat frame being elevation adjustable by pivoting about an athwart horizontal axis arranged fore on the main frame near the steering head. The seat frame is illustrated in an elevated position.
Figure 4:
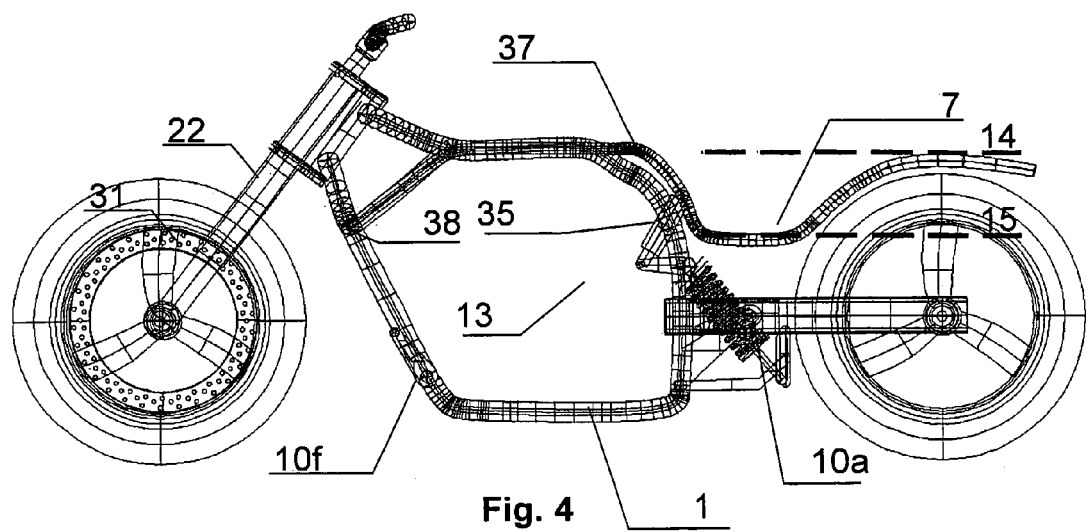
FIG. 4 illustrates the same stripped-down version of the second, alternative embodiment of the invention from FIG. 3, with seat frame arranged in a lowered position. The position illustrated is an almost maximally lowered position for the seat and for a generally fully compressed dampener position for the rear frame so as for to illustrate the low position. The same description of the situation illustrated in the following low seat position images is valid in FIGS. 6, and 8.
Figure 5:
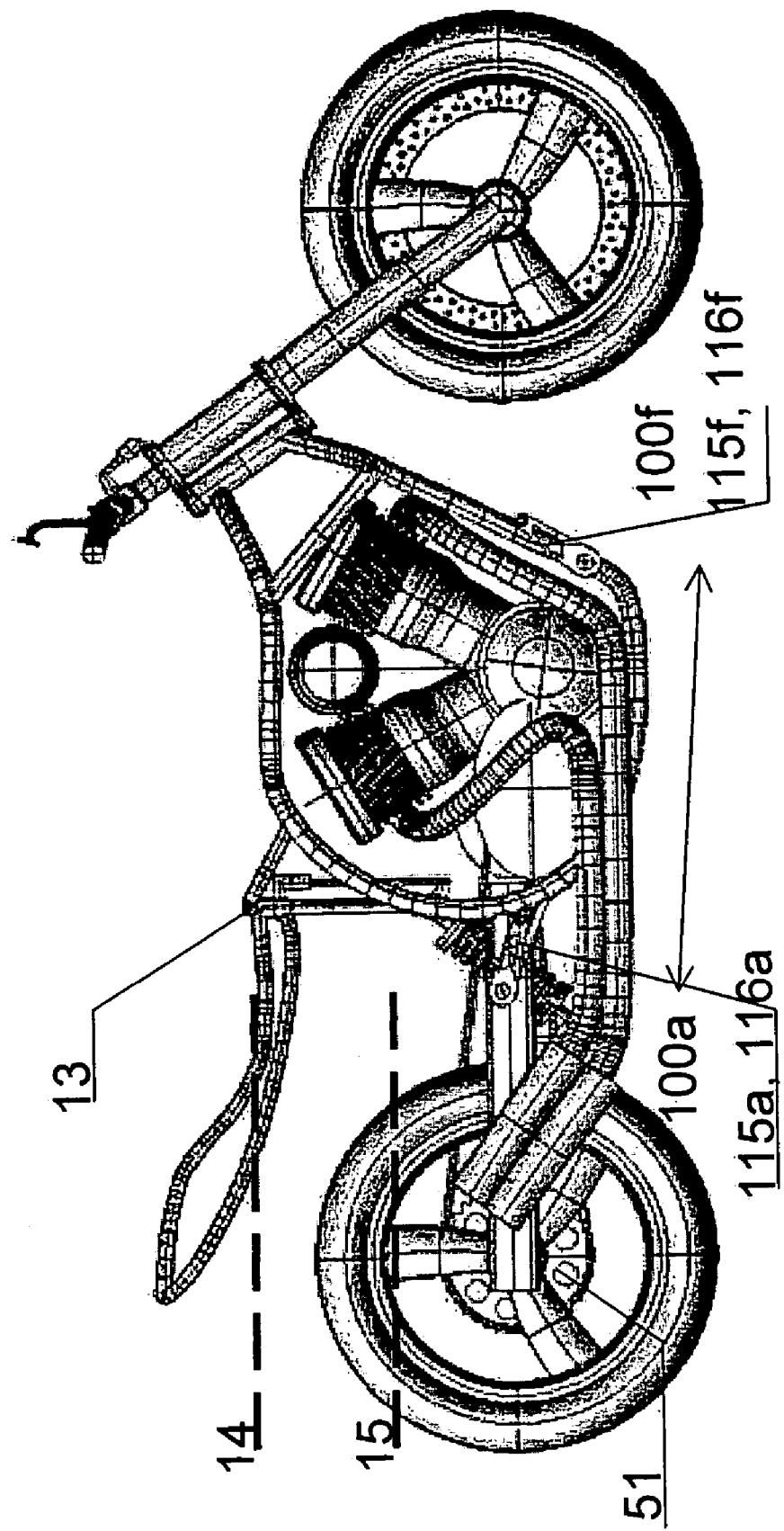
FIG. 5 is a right side elevation view of the first alternative embodiment of the invention, with the seat being shown in an elevated position on the generally vertical rail assembly arranged behind the tank and fixed to the main frame above and near a pivot point of the rear swing arm for the rear wheel.
Figure 6:
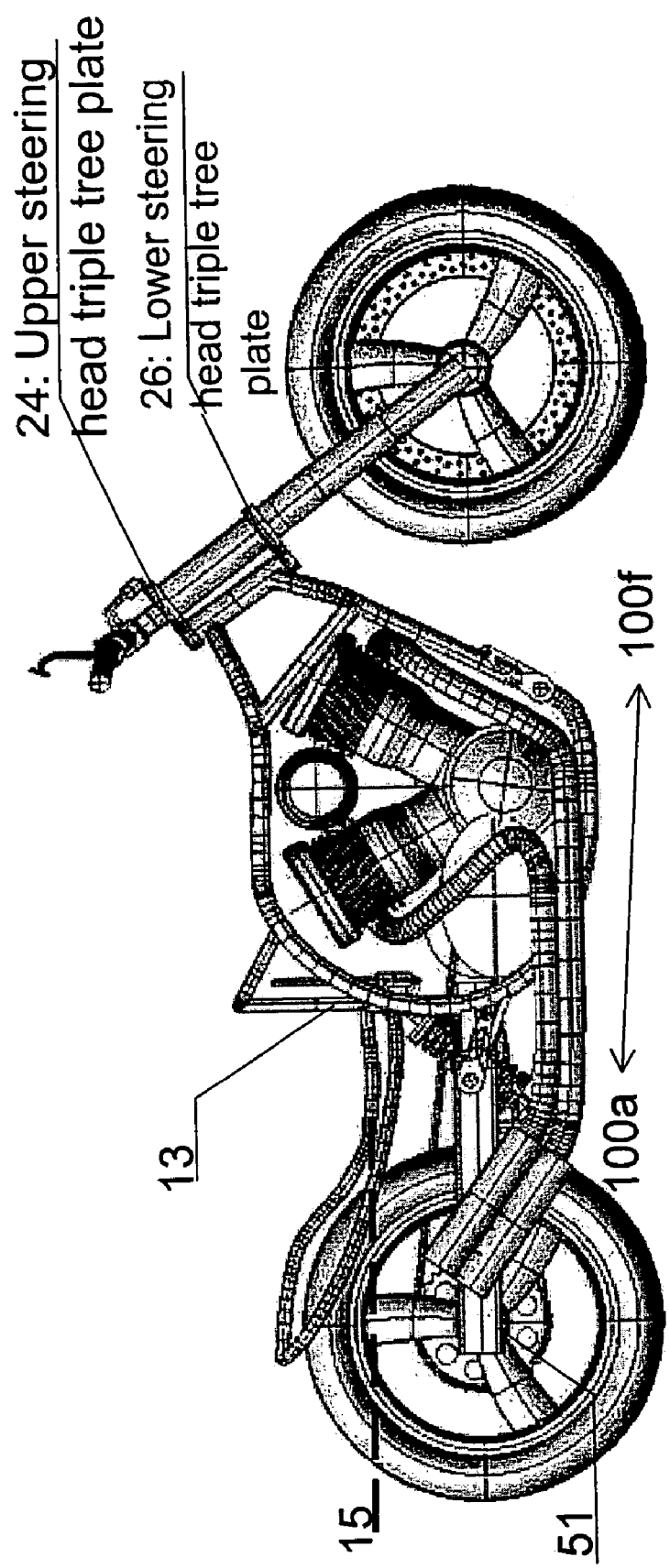
FIG. 6 is a right side elevation view of the first alternative embodiment of the invention similar to FIG. 5, but with the seat being shown in a lowered position on the generally vertical rail.

According to a second alternative illustrated in FIGS. 3 and 4, the seat moving assembly (13) includes a generally forward extension (37) of said seat (7), said forward extension (37) being fixed to said main frame (1) in a fore horizontal pivot axis (38) near said steering head (25), and with a seat elevation actuator (35) fixed with one force transfer end to said main frame (1), and a second force transfer end fixed to said seat (7) or said forward extension (37) at a distance from said pivot axis (38).

An Embodiment with One Movable Pair of Driver Footpegs.

According to a second general preferred embodiment of the invention, said main frame (1) includes a driver footpeg assembly (11) with a set of footpegs (10*m*) arranged for being moved on a sliding rail (126) by means of electrical, hydraulic or pneumatic actuators of a suitable kind, please refer to FIGS. 10, 13, 14, 15, and 16. The fore-and aft moving footpeg actuator may be controlled by electrical switches or computer controlled to cooperate with a desired combination with seat elevation, see FIGS. 13 and 15 for the crouched driver posture and FIGS. 14 and 16 for the reclined driver posture. This moveable set of footpegs (10*m*) may be moved forwardly to a fore position (100*f*) for use with said reclined "custom chopper" position, see particularly FIGS. 14 and 16, allowing for the driver's legs to be extended in a forward direction for resting said driver's feet on said footpegs (10*m*). Oppositely, the set of footpegs (10*m*) may be moved rearward to an aft position (100*a*) for use with said elevated crouched racing position, allowing for the driver's feet to be supported by said footpegs (10*m*) positioned generally below said seat (7), see particularly FIGS. 13 and 15. The movable footpeg assembly (10*m*) may be moved by means of an electrical or hydraulic or pneumatic actuator or motor of a suitable make, powered by the accumulator battery or another power source. 30. Said footpeg assembly (11) according to this second general preferred embodiment may be arranged to move and halt said movable footpegs (10*m*) to any intermediate position between said fore and aft positions (100*f*, 100*a*) for said footpegs (10*m*). According to an alternative embodiment of the invention, said right and left footpeg assemblies (10*m*) may be moved independently of each other by independent right and left side electrical actuator controls to provide an asymmetric riding posture if desired.

Like with the double-pair footpeg embodiment, the main frame (1) is further being provided with a seat moving assembly (13) for moving the driver seat (7) between said first elevated position (14), for use with said aft position (100*a*) of said footpegs (10*m*), and said second lowered seat position (15) for use with said fore position (100*f*) of said footpegs (10*m*).

According to a preferred embodiment of the second general preferred embodiment of the invention, said footpeg assembly (11) may include a foot operated gearshift lever assembly (110) arranged to move with said movable footpegs (10*m*) and arranged for rotating the neutral position of a foot operated gearshift lever (111) to accommodate a changing attack angle of the driver's gearshift operating foot depending on the actual position of the footpeg (10*m*) between and including said fore and aft positions (100*f*, 100*a*), said gearshift lever assembly being flexibly connected by e.g. a wire-and-hose or a hydraulic connection to said transmission assembly (6). The gearshift lever assembly's (110) neutral gear lever position of the gearshift lever (111) may be rotated by an electrical or hydraulic actuator. The neutral gear lever angular attitude may change between a slightly downward pointing gearshift lever neutral position in the rear footpeg position (100*a*) to accommodate the driver's slightly downward pointing foot, see FIG. 13) and being changed gradually upward with the gradually forward sliding footpeg (10*m*) to become gradually steeper and ending up with the neutral position of the gearshift lever position in an upwards inclined pointing direction when the sliding footpeg (10*m*) approaches the fore footpeg position (100*f*). Said footpeg assembly (11) may also include a foot operated brake pedal lever assembly (115) arranged to move with said movable footpegs (10*m*) and arranged for rotating a foot operated brake pedal lever (116) in a similar manner to the rotation of the gearshift lever assembly, so as to accommodate a changing attack angle of the driver's braking foot depending on the actual position of the footpeg (10*m*) between and including said fore and aft positions (100*f*, 100*a*). The brake pedal lever assembly (115) being flexibly connected by e.g. a wire-and-hose or a hydraulic brake force transfer means (not illustrated) to one or both of a rear wheel brake (51) and a front wheel brake (31). Having said foot brake pedal lever assembly (115) moving with the footpegs may be safer because braking may take place while the footpegs (10*m*) slide forward or backward, due to the fact that the braking foot will continuously be in a convenient position for activating the brake pedal. This eliminates time that would otherwise be needed for moving the braking foot to the correct foot peg before finding, pressing and activating the brake pedal lever. Likewise, having said gearshift lever assembly (110) moving with the footpegs (10m) is advantageous due to the fact that gear shifting may take place while the footpegs (10m) slide forward or backward, due to the fact that the gear shifting foot is continuously in the correct position for activating the gearshift pedal. This may be quite relevant to use while running in low gear in a crouched posture and desiring to shift to a higher gear while accelerating out of a curved road portion to a long, easily driven open road, at the same time as the driver desires to lower the saddle (7) simultaneously moving the foot pegs (10m) in a continuous, gliding, elegant transition, to allow for a more reclined, relaxed driving posture. Oppositely, if the transition from the reclined posture to a crouched, racing-like posture is activated before an oncoming road curve, and the transition will take, say 3 seconds, it may be advantageous to be able to conduct a few gearshifts down while encountering the road curve still in a transitional posture.

Fore and Aft Footpeg Positions

For the present invention and relating the motorcycle with a driver's desire of changing his driving posture, we may as well rely on the function of providing fore and aft footpeg positions, rather than the mere material presence of two sets of foot pegs or one mobile set of foot pegs. Thus, below we use the term "said footpegs (10m or 10f) having a fore position (100f) for use with said reclined position, and likewise with "said footpegs (10a or 10m) having an aft position (100a) for use with said crouched posture of the driver." We would therefore define the invention as a motorcycle construction for permitting a rider to assume either a first elevated crouched racing position, or a second lowered, reclined, feet-forward "custom chopper" position. The motorcycle therefore includes a main frame assembly (1) provided with a front wheel suspension assembly (2), holding a front wheel (3) as well as a set of handlebars (9) provided with handgrips (18) for enabling the driver to steer and control said motorcycle, and a rear wheel suspension assembly (4) holding a rear wheel (5), and a combined engine/transmission assembly (6) arranged for driving said rear wheel (5) or said front wheel (3) or both wheels (5,3), as before. The main frame is further provided with a seat (7) for a driver, and a driver footpeg assembly (11) arranged on said main frame (1), including one or more sets of driver footpegs (10m, or 10f and 10a), wherein said footpegs (10m or 10f) provide a fore position (100f) for use with said reclined "custom chopper" position, allowing for said driver's legs to be extended in a forward direction for resting said driver's feet on said fore footpeg position (100f). The main frame (1) also includes and said footpegs (10m or 10a) providing an aft position (100a) for use with said elevated crouched racing position, allowing for said driver's feet to be supported on said aft footpeg position (100a) generally below said seat (7); said main frame further provided with a seat moving assembly (13) for moving said driver seat (7) between said first elevated position (14), for use with said aft position (100a) of said footpegs (10m or 10a), and said second, lowered seat position (15) for use with said fore position (100f) of said footpegs (10m or 10f).

Figure 17:
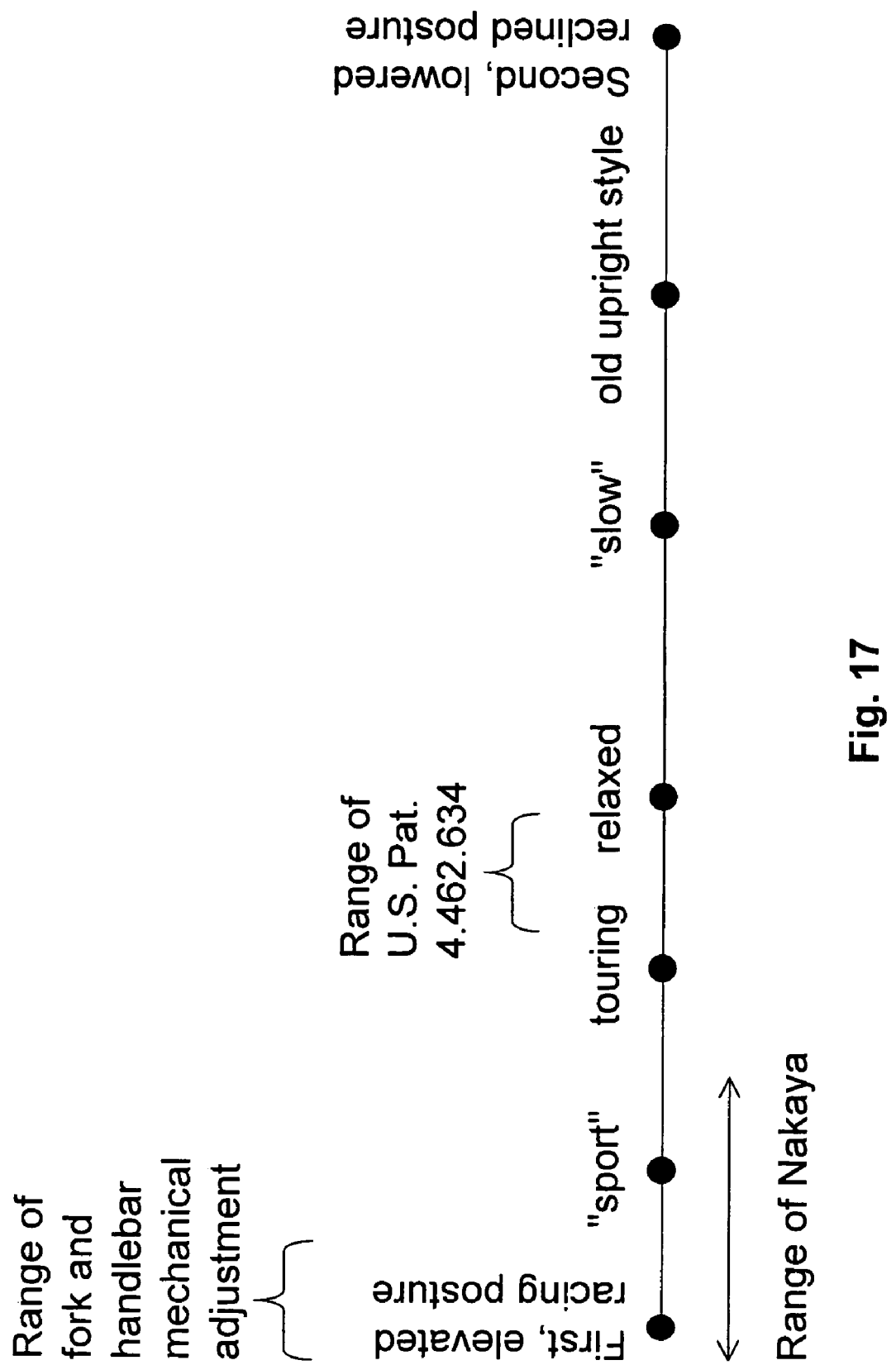
FIG. 17 is a linear scale comparison of the range of variation of postures provided by the present invention as compared to the known art. Particularly, the continuous variation in riding posture provided by the embodiment illustrated in FIGS. 13, 14, 15, and 16 covers a far wider continuous range than the known art.

A major difference between the present invention and the nearest known art represented by Nakaya's patent, is that while Nakaya provides a small adjustment of the riding position between two rather crouched, racing-like positions while never allowing for complete extension of the driver's legs while sitting in a leant-back relaxing position, the motorcycle according to the invention provides for a convenient way for completely shifting back and forth between a reclined, relaxing body posture while still driving comfortably and safely, and a cutting-edge active crouched racing-like driving posture. Please refer to FIG. 17 for range comparison with this and other known art and the invention. Among potential users of the motorcycle construction according to the invention should be motorcycle riding police that may need to quickly shift their driving posture into a racing-like position for chasing delinquents, and later change to a reclined cruising driving posture while recovering from the chase and continuing to observe the traffic.

I claim:

1. A motorcycle construction for permitting a rider to assume either a first, elevated crouched racing position, or a second, lowered, reclined feet-forward position,
    said motorcycle including a main frame assembly (1) provided with a front wheel suspension assembly (2), holding a front wheel (3) as well as a handlebar assembly (9) with two handgrips (18) for enabling the driver to steer and control said motorcycle, and a rear wheel suspension assembly (4) holding a rear wheel (5), and a combined engine/transmission assembly (6) arranged for driving said rear wheel (5) or said front wheel (3) or both wheels (5,3);
    said main frame further being provided with a seat (7) for a driver,
    a handlebar adjustment assembly (19) for adjusting the handlebar assembly (9) between a rearward custom cruiser position (20), and a forward racing position (21),
    wherein said main frame is provided with two pairs of footpegs, one fore footpeg pair (10f) and an aft footpeg pair (10a) for the driver's feet, said fore position pair(10f) being forward of said seat for use with said second position and being arranged on said main frame assembly (1) at a fore position, allowing said drivers legs to be extended forward of said seat, and said aft pair (10a) for use with said first position, allowing said driver's feet to be positioned generally below said seat (7);
    said main frame (1) further being provided with a seat moving assembly (13) for moving said driver seat (7) between said first position (14), for use with said aft pair of footpegs (10a), and said second position (15) for use with said fore pair of footpegs (10f),
    wherein said main frame (1) further includes a steering head assembly (2) including an inclined steering head pipe (25) with bearings for rotating upper and lower steering head triple tree plates (24, 26) holding upper portions of telescopic front wheel suspension fork arms (22) holding said front wheel (3),
    wherein said handlebar (9) is mounted for being rotating about a horizontal axis (9d) in bearings (9e) on said upper steering head triple tree plate (24), said upper steering head triple tree plate (24) being provided with a forward extending actuator link arm (9c) holding an actuator (9a) connected to a handlebar moment link arm (9b) for rotating said handlebar (9) in its bearings (9e) while said actuator (9a) is shortened or lengthened, so as to adapt said handlebar (9) and handgrips (18) for said rearward custom cruiser position (20) or for said forward racing position (21).

2. The motorcycle construction of claim 1, wherein said handlebar is provided with a clutch lever (27) corresponding with a first of said handqrips (18), and a hand brake lever (28) corresponding with a second of said handgrips (18), and rear view mirrors (29).

3. The motorcycle of claim 2, wherein said clutch lever (27) and said hand brake lever (28) are linked to said handlebar rotating actuator (9a) in order to adjust their angular position with respect to said handlebar (9) when said handlebar is rotated, so as for said hand brake lever (28) and clutch lever (27) to adapt to be in line with the driver's forearm when the handlebar (9) rotates, in order to improve the driver's catch on the brake and clutch levers (27, 28).

4. A motorcycle construction for permitting a rider to assume either a first, elevated crouched racing position, or a second, lowered, reclined feet-forward position, said motorcycle including a main frame assembly (1) provided with a front wheel suspension assembly (2), holding a front wheel (3) as well as a handlebar assembly (9) with two handgrips (18) for enabling the driver to steer and control said motorcycle, and a rear wheel suspension assembly (4) holding a rear wheel (5), and a combined engine/transmission assembly (6) arranged for driving said rear wheel (5) or said front wheel (3) or both wheels (5,3);

said main frame further being provided with a seat (7) for a driver, wherein said main frame is provided with two pairs of footpegs, one fore footpeg pair (10f) and an aft footpeg pair (10a) for the driver's feet, said fore position pair(10f) being forward of said seat for use with said second position and being arranged on said main frame assembly (1) at a fore position, allowing said drivers legs to be extended forward of said seat, and said aft pair (10a) for use with said first position, allowing said driver's feet to be positioned generally below said seat (7); said main frame (1) further being provided with a seat moving assembly (13) for moving said driver seat (7) between said first position (14), for use with said aft pair of footpegs (10a), and said second position (15) for use with said fore pair of footpegs (10f), wherein said seat moving assembly (13) includes a generally forward extension (37) of said seat (7), said forward extension (37) being fixed to said main frame (1) in a fore horizontal pivot axis (38) near said steering head (25), and with a seat elevation actuator (35) fixed with one force transfer end to said main frame (1), and a second force transfer end fixed to said seat (7) or said forward extension (37) at a distance from said pivot axis (38).

5. A motorcycle construction for permitting a rider to assume either a first elevated crouched racing position, or a second lowered, reclined, feet-forward position, said motorcycle including a main frame assembly (1) provided with a front wheel suspension assembly (2), holding a front wheel (3) as well as a handlebar assembly (9) with two handgrips (18) for enabling the driver to steer and control said motorcycle, and a rear wheel suspension assembly (4) holding a rear wheel (5), and a combined engine/transmission assembly (6) arranged for driving said rear wheel (5) or said front wheel (3) or both wheels (5,3), said main frame further provided with a seat (7) for a driver, wherein said main frame (1) includes a driver footpeg assembly (11) with a set of footpegs(10m) arranged for being moved on a slide rail (26), said set of footpegs (10m) arranged for being moved between a fore position (100f) forward of said seat for use with said second position, allowing said driver's legs to be extended forward of said seat for resting said driver's feet on said footpegs (10m), and an aft position (100a) for use with said first position, allowing said driver's feet to be supported by said footpegs (10m) positioned generally below said seat (7);

said footpeg assembly including an actuator that moves said set of footpegs;

said main frame further being provided with a seat moving assembly (13) for moving said driver seat (7) between said first position (14), for use with said aft position (100a) of said footpegs (10m), and said second position (15) for use with said fore position (100f) of said footpegs (10m).

6. The motorcycle construction of claim 5, wherein said footpeg assembly (11) includes a foot operated gearshift lever assembly (110) arranged to move with said movable footpegs (10m) and arranged for rotating a foot operated gearshift lever (111) to accommodate a changing attack angle of the driver's gearshift operating foot depending on the actual position of the footpeg (10m) between and including said fore and aft positions (100f, 100a), said gearshift lever assembly being flexibly connected to said transmission assembly (6).

7. The motorcycle construction of claim 5, wherein said footpeg assembly (11) includes a foot operated brake pedal lever assembly (115) arranged to move with said movable footpegs (10m) and arranged for rotating a foot operated brake pedal lever (116) to accommodate a changing attack angle of the driver's braking foot depending on the actual position of the footpeg (10m) between and including said fore and aft positions (100f, 100a), said brake pedal lever assembly (115) being flexibly connected to one or both of a rear wheel brake (51) and a fore wheel brake (31).

8. The motorcycle construction of claim 5, wherein said seat moving assembly (13) is arranged for halting said seat (7) in any desired intermediate position between said first and second positions.

9. The motorcycle construction of claim 5, further provided with a handlebar adjustment assembly (19) for adjusting the handlebar (9, 18) between a rearward custom cruiser position (20), and a forward racing position (21).

10. The motorcycle of claim 9, wherein said main frame (1) being provided with a steering head assembly (2) including an inclined steering head pipe (25) with bearings for rotating upper and lower steering head triple tree plates (24, 26) holding upper portions of telescopic front wheel suspension fork arms (22) holding said front wheel (3).

11. The motorcycle construction of claim 10, wherein said handlebar assembly (9) is mounted for being rotating about a horizontal axis (9d) in bearings (9e) on said upper steering head triple tree plate (24), said upper steering head triple tree plate (24) provided with a forward extending actuator link arm (9c) holding an actuator (9a) connected to a handlebar moment link arm (9b) for rotating said handlebar (9) in its bearings (9e) while said telescoping actuator (9a) is shortened or lengthened, so as for said handlebar (9) and handgrips (18) to adapt for said rearward custom cruiser position (20) or said forward racing position (21).

12. The motorcycle construction of claim 11, wherein said handlebar assembly (9) is provided with a clutch lever (27) corresponding in action with a first of said handgrips (18), and a hand brake lever (28) corresponding in action with a second of said handgrips (18), and rear view mirrors (29).

13. The motorcycle of claim 12, wherein said clutch lever (27) and said hand brake lever (28) being linked to said handlebar rotating actuator (9a) in order to adjust their angular position with respect to said handlebar (9) when said handlebar is rotated, so as for said hand brake lever (28) and clutch lever (27) to adapt to be in line with the driver's forearm when the handlebar (9) rotates, in order to improve the driver's catch on the brake and clutch levers (27, 28).

14. The motorcycle construction of claim 5, wherein said seat moving assembly (13) includes a generally vertically inclined straight, tube-shaped rail or rails (33) and fixed to the main frame (1) and arranged generally arranged immediately in front of said driver's seat (7), said tubeshaped rail or rails including vertically running short, elongate cylindrical sleeves (34) with said seat (7) welded or otherwise fixedly attached to said sleeves (34), and with a seat elevation actuator (35) fixed with one force transfer end to said main frame (1), and a second force transfer end fixed to said seat (7) or said vertically running sleeves (34).

15. The motorcycle construction of claim 5, wherein said footpeg assembly (11) being arranged to move said movable footpegs (10m) to any intermediate position between said fore and aft positions (100f, 100a) for said footpegs (10m).

16. The motorcycle construction of claim 5, wherein said seat (7) carrying underneath a mudguard assembly for said rear wheel (5).

17. The motorcycle construction of claim 5, wherein said seat moving assembly (13) includes a generally forward extension (37) of said seat (7), said forward extension (37) being fixed to said main frame (1) in a fore horizontal pivot axis (38) near said steering head (25), and with a seat elevation actuator (35) fixed with one force transfer end to said main frame (1), and a second force transfer end fixed to said seat (7) or said forward extension (37) at a distance from said pivot axis (38).

18. A motorcycle construction for permitting a rider to assume either a first elevated crouched racing position, or a second lowered, reclined, feet-forward position, said motorcycle including a main frame assembly (1) provided with a front wheel suspension assembly (2), holding a front wheel (3) as well as a set of handlebars (9) provided with handgrips (18) for enabling the driver to steer and control said motorcycle, and a rear wheel suspension assembly (4) holding a rear wheel (5), and a combined engine/transmission assembly (6) arranged for driving said rear wheel (5) or said front wheel (3) or both wheels (5,3);

said main frame further provided with a seat (7) for a driver, and a driver footpeg assembly (11) arranged on said main frame (1), including one or more sets of driver footpegs (10m, or 10f and 10a)

wherein said footpegs (10m or 10f) providing a fore position (100f) forward of said seat for use with said second position, allowing said driver's legs to be extended forward of said seat for resting said driver's feet on said fore footpeg position (100f), and said footpegs (10m or 10a) providing an aft position (100a) for use with said first position, allowing said driver's feet to be supported on said aft footpeg position (100a) generally below said seat (7);

said main frame further provided with a seat moving assembly (13) for moving said driver seat (7) between said first position (14), for use with said aft position (100a) of said footpegs (10m or 10a), and said second position (15) for use with said fore position (100f) of said footpegs (10m or 10f), wherein said footpeg assembly (11) includes a foot operated brake pedal lever assembly (115) arranged to move with said movable footpegs (10m) and arranged for rotating a foot operated brake pedal lever (116) to accommodate a changing attack angle of the driver's braking foot depending on the actual position of the footpeg (10m) between and including said fore and aft positions (100f, 100a), said brake pedal lever assembly (115) being flexibly connected by a wire-and-hose or a hydraulic brake force transfer means to one or both of a rear wheel brake (51) and a fore wheel brake (31).

19. A motorcycle construction for permitting a rider to assume either a first elevated crouched racing position, or a second lowered, reclined, feetforward position, said motorcycle including a main frame assembly (1) provided with a front wheel suspension assembly (2), holding a front wheel (3) as well as a set of handlebars (9) provided with handgrips (18) for enabling the driver to steer and control said motorcycle, and a rear wheel suspension assembly (4) holding a rear wheel (5), and a combined engine/transmission assembly (6) arranged for driving said rear wheel (5) or said front wheel (3) or both wheels (5,3); and a handlebar adjustment assembly (19) for adjusting the handlebar (9, 18) between a rearward custom cruiser position (20), and a forward racing position (21), said main frame further provided with a seat (7) for a driver, and a driver footpeg assembly (11) arranged on said main frame (1), including one or more sets of driver footpegs (10m, or 10f and 10a), wherein said footpegs (10m or 10f) providing a fore position (100f) forward of said seat for use with said second position, allowing said driver's legs to be extended forward of said seat for resting said driver's feet on said fore footpeg position (100f), and said footpegs (10m or 10a) providing an aft position (100a) for use with said first position, allowing said driver's feet to be supported on said aft footpeg position (100a) generally below said seat (7); said main frame further provided with a seat moving assembly (13) for moving said driver seat (7) between said first position (14), for use with said aft position (100a) of said footpegs (10m or 10a), and said second position (15) for use with said fore position (100f) of said footpegs (10m or 10f), said main frame (1) having a steering head assembly (2) including an inclined steering head pipe (25) with bearings for rotating upper and lower steering head triple tree plates (24, 26) holding upper portions of telescopic front wheel suspension fork arms (22) holding said front wheel (3).

20. The motorcycle construction of claim 19, wherein said handlebar (9) being mounted for being rotating about a horizontal axis (9d) in bearings (9e) on said upper steering head triple tree plate (24), said upper steering head triple tree plate (24) provided with a forward extending actuator link arm (9c) holding an actuator (9a) connected to a handlebar moment link arm (9b) for rotating said handlebar (9) in its bearings (9e) while said telescoping actuator (9a) is shortened or lengthened, so as for said handlebar (9) and handgrips (18) to adapt for said rearward custom cruiser position (20) or said forward racing position (21).

21. The motorcycle construction of claim 20, wherein said handlebar assembly being provided with a clutch lever (27) corresponding with a first of said handgrips (18), and a hand brake lever (28) corresponding with a second of said handgrips (18), and rear view mirrors (29).

22. The motorcycle of claim 21, wherein said clutch lever (27) and said hand brake lever (28) are linked to said handlebar rotating actuator (9a) in order to adjust their angular position with respect to said handlebar (9) when said handlebar is rotated, so as for said hand brake lever (28) and clutch lever (27) to adapt to be in line with the driver's forearm when the handlebar (9) rotates, in order to improve the driver's catch on the brake and clutch levers (27, 28).

23. A motorcycle construction for permitting a rider to assume either a first elevated crouched racing position, or a second lowered, reclined, feetforward position, said motorcycle including a main frame assembly (1) provided with a front wheel suspension assembly (2), holding a front wheel (3) as well as a set of handlebars (9) provided with handgrips (18) for enabling the driver to steer and control said motorcycle, and a rear wheel suspension assembly (4) holding a rear wheel (5), and a combined engine/transmission assembly (6) arranged for driving said rear wheel (5) or said front wheel (3) or both wheels (5,3); said main frame further provided with a seat (7) for a driver, and a driver footpeg assembly (11) arranged on said main frame (1), including one or more sets of driver footpegs (10*m*, or 10*f* and 10*a*)

wherein said footpegs (10*m* or 10*f*) providing a fore position (100*f*) forward of said seat for use with said second position, allowing said driver's legs to be extended forward of said seat for resting said driver's feet on said fore footpeg position (100*f*), and said footpegs (10*m* or 10*a*) providing an aft position (100*a*) for use with said first position, allowing said driver's feet to be supported on said aft footpeg position (100*a*) generally below said seat (7);

said main frame further provided with a seat moving assembly (13) for moving said driver seat (7) between said first position (14), for use with said aft position (100*a*) of said footpegs (10*m* or 10*a*), and said second position (15) for use with said fore position (100*f*) of said footpegs (10*m* or 10*f*), wherein said seat moving assembly (13) includes a generally forward extension (37) of said seat (7), said forward extension (37) being fixed to said main frame (1) in a fore horizontal pivot axis (38) near said steering head (25), and with a seat elevation actuator (35) fixed with one force transfer end to said main frame (1), and a second force transfer end fixed to said seat (7) or said forward extension (37) at a distance from said pivot axis (38).

\* \* \* \* \*